Jan. 20, 1942.   H. GALLUSSER   2,270,701
APPARATUS FOR THE REDUCTION OF OXIDES
Original Filed Dec. 7, 1937   3 Sheets-Sheet 1
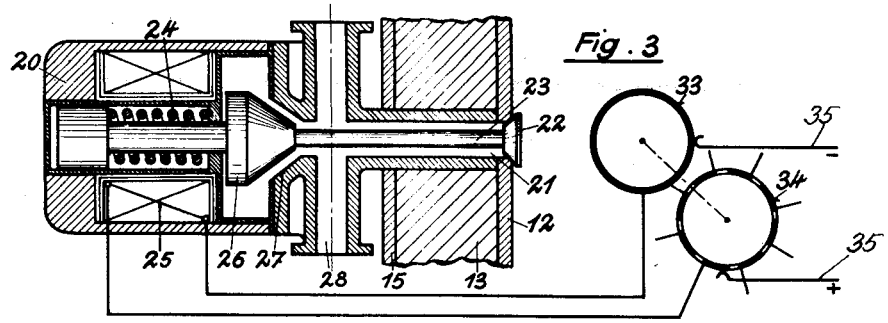
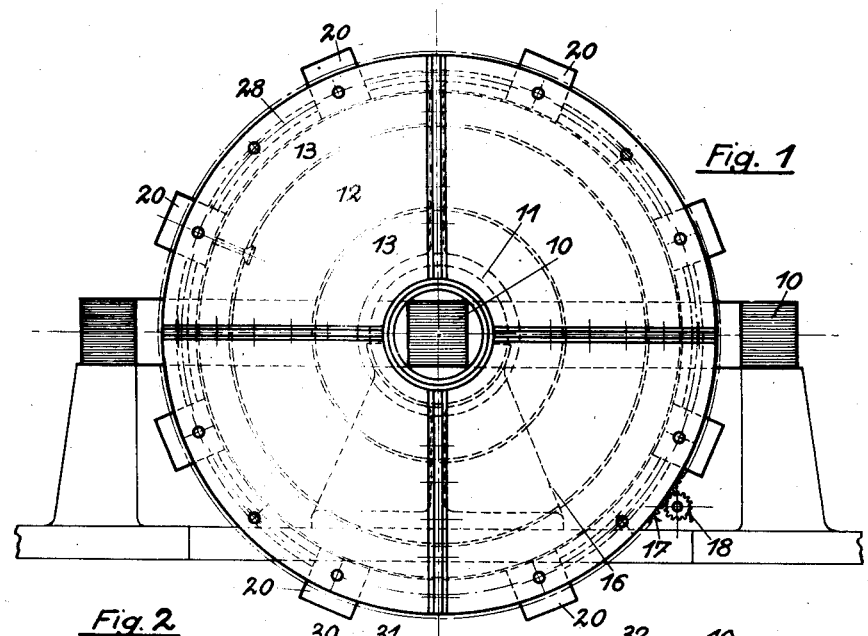
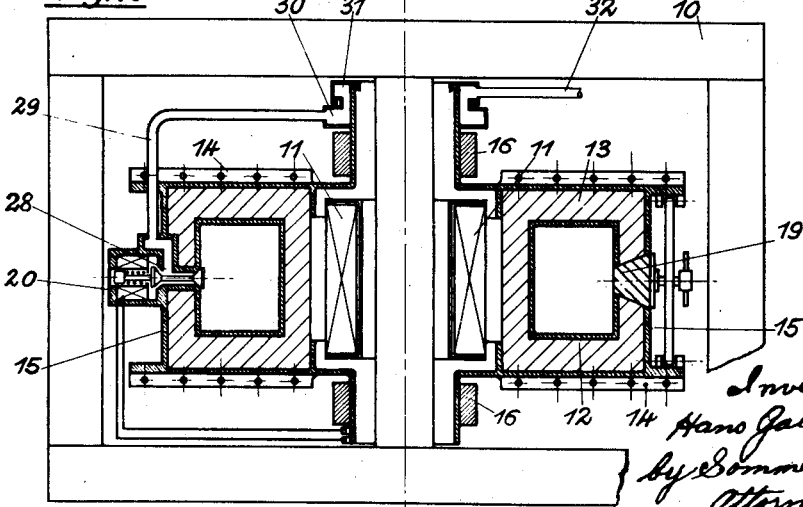

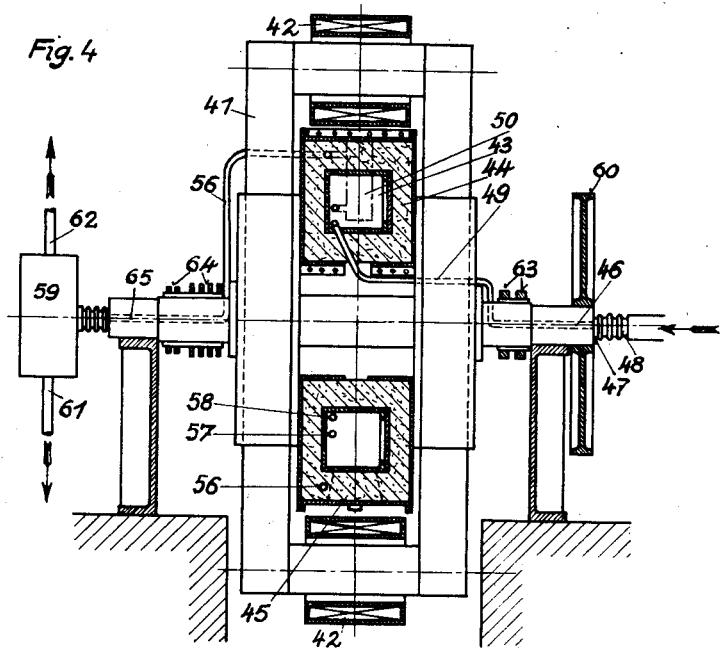
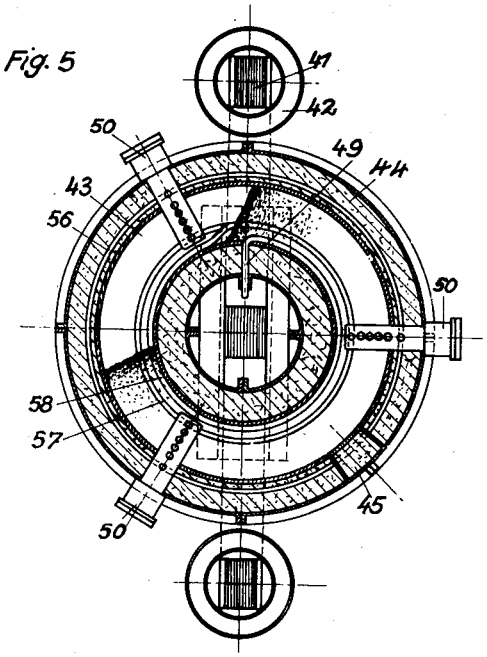
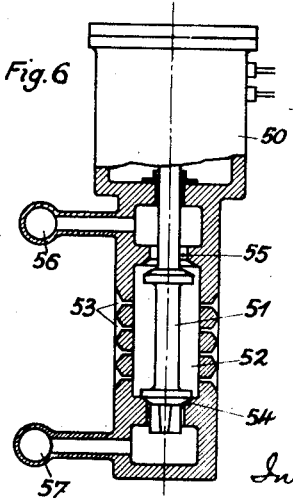

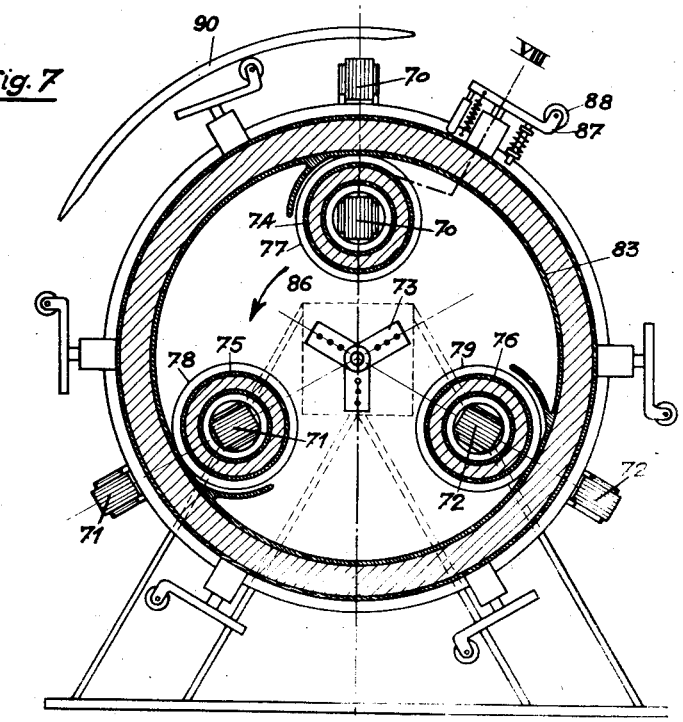
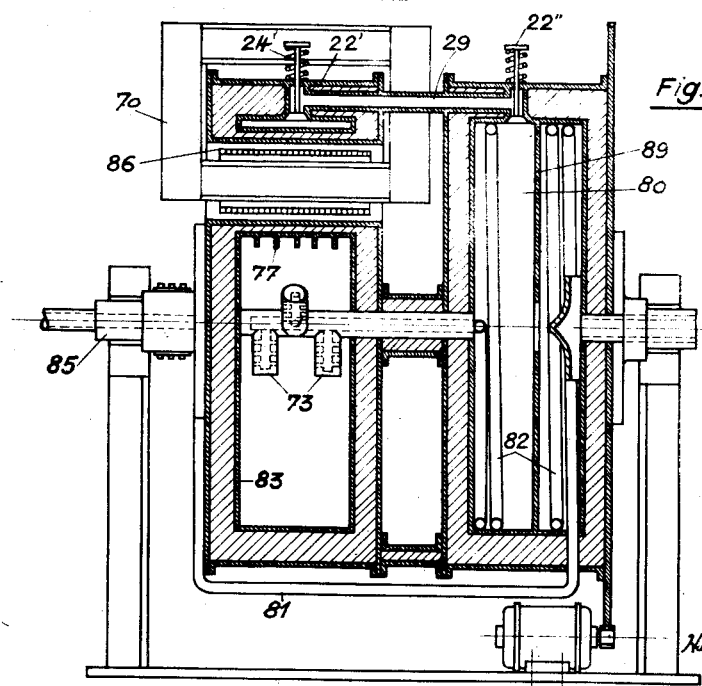

Patented Jan. 20, 1942

2,270,701

UNITED STATES PATENT OFFICE 2,270,701

APPARATUS FOR THE REDUCTION OF OXIDES

Hans Gallusser, Geneva, Switzerland

Original application December 7, 1937, Serial No. 178,593. Divided and this application June 24, 1939, Serial No. 281,046. In Germany December 16, 1936

4 Claims. (Cl. 13—26)

Hitherto iron oxides, such as for example, iron ores, have generally been reduced and melted in smelting furnaces with coke as the fuel and reducing agent. The smelting heat in smelting furnaces has also been produced by electrical energy and in such smelting furnaces so much coke as was necessary for the reduction of the iron oxide was supplied. In this manner there was produced a reduction of the consumption of coke by about one-half. In spite of this there are countries in which iron ore is available but in which there are no coal deposits and these countries have to rely upon the import of coal from abroad which renders the treatment of iron ores more or less difficult.

Rotary, electrically heated, reducing furnaces are known, in which the heating current is passed through the ore mixed with coal. As, however, the resistance of the ores differs considerably before and after reduction, this heating cannot be regarded as satisfactory. Further the iron sponge formed between the electrodes may form bridges for the current, in which the iron sponge commences to sinter, in consequence of the considerable heating, which leads to disturbances in operation.

Endeavours have also been made to carry out the reduction of iron ores by means of hydrogen. These attempts have, however, failed because it was not possible hitherto to cause the hydrogen to pass completely through the mass of ore to be reduced.

The apparatus according to the present invention enables the above-mentioned disadvantages to be eliminated.

According to the present invention a closed annular metal vessel is adapted to receive the material to be treated and an annular wall of this vessel forms the secondary of a transformer. The vessel is closed in a fluidtight manner and is mounted on a rotatable shaft.

The metal vessel may be located around the primary winding of a transformer or the primary winding may be located on the outer limbs of the frame of a transformer rotatably mounted with the metal vessel.

In comparison with the known reduction apparatus, the apparatus according to the present invention has the substantial advantage that the temperature can be maintained accurately at the value necessary for the reduction and, as the ore itself is not utilised for the electrical heating, danger of sintering is entirely excluded.

The accompanying drawings show by way of example and diagrammatically a number of forms of construction of devices according to the present invention.

In the drawings:

Fig. 1 is an elevation of a rotary reduction furnace, heated by an induced current, in which a reducing agent, for example coal is used.

Fig. 2 is a sectional plan.

Fig. 3 shows a detail on a larger scale.

Fig. 4 is a sectional view in a plane parallel to the axis of a furnace, in which hydrogen is used as the reducing agent.

Fig. 5 is a corresponding sectional view at right angles to the axis of rotation.

Fig. 6 shows a valve on a larger scale.

Figs. 7 and 8 illustrate a form of construction suitable for three-phase current, Fig. 8 being a sectional view on the line VIII—VIII of Fig. 7.

In Figs. 1 and 2, numeral 10 designates the magnet frame of a transformer and 11 the primary winding thereof fixedly mounted on the middle leg of the transformer frame within a central opening in the furnace. The secondary is formed by the annular closed metal vessel 12, which is protected against heat losses towards the outside by the insulating mass 13. The whole is surrounded by a casing formed by end plates 14 and an external ring 15. Both the end plates 14 and the ring 15 must naturally be divided into sections and relatively insulated as otherwise they would constitute a short-circuited winding and would consequently also be heated by the induced current.

The container thus formed is rotatably mounted in bearings 16 and is driven by means of a toothed flange 17, provided at the periphery thereof and a toothed wheel 18 (see Fig. 1) meshing therewith.

The vessel 12 is provided with a charging opening 19 and is also provided at its periphery with valves 22, located at uniformly spaced intervals, for conducting away the gases generated during the reduction.

The valves 22 are controlled electrically and for this purpose are constructed as shown in Fig. 3.

Through the wall of the container 12, the insulating mass 13 and the annular jacket 15 extends a passage 21 of which the end in the container 12 is closed by a valve body 22. The spindle 23 of valve 22 is subjected on the one hand to the action of a spring 24 which presses the valve body 22 against the end of passage opening 21 which serves as a valve seat and on the other hand to the action of an electromagnet 25 which, when energised, moves the valve body 22 away from the end of opening 12 that is the valve seat.

In order to protect the part of the valve casing 20, in which the electromagnet is located, from the hot exhaust gases, the valve spindle 23 is provided with a second valve body 26 which, when the valve 22 is opened, bears against a conical seat 27 formed on the valve casing 20 and thus completely shuts off the outer valve casing from the passage 21.

Gases escaping from the passage 21 pass into a collecting passage 28 and from here are conducted by a pipe 29 into a two-part container, of which one part 30 rotates with the furnace, whilst the other part 31 remains stationary. From the latter the gases are conducted by a pipe 32.

The collecting passage 28 naturally does not form a closed ring, but, as shown in Fig. 1, is interrupted or omitted between the two valve casings 20 located in the lowermost position. In this position the pipe 29 is located at the middle of the upper half of the vessel 12.

In order that the valves 22 will open only when they are above a horizontal plane passing through the axis of rotation, so as to avoid clogging by the ore which is introduced, they are actuated electrically as shown in Fig. 3.

On the rotary shaft of the furnace there are provided two contact rings 33 and 34, to which the electromagnets 25 are connected. The contact ring 34 is subdivided in accordance with the number of valves 22. Against the two rings 33 and 34 there bear brushes 35 which are connected to a source of current, and the position of the brush which is in contact with the ring 34 is so selected that the electromagnets 25 are only energised when they are located above the horizontal plane passing through the axis of rotation so that no ore can enter the passages 21.

It will be obvious that the valves 22 may also be actuated mechanically by causing them to open when in the desired position, for example by suitable stops.

The method of operation of this apparatus is as follows:

After a sufficient quantity of ore, with the admixture necessary for the reduction, has been charged into the container 12 through the charging opening 19, so as to fill the same to about half, current is passed through the primary winding 11 and a slow rotary movement is imparted to the container. The walls of the latter are heated by the induced current produced therein and as they constitute a comparatively large surface in contact with the mass of ore, the transmission of heat takes place very rapidly. This transmission of heat takes place practically only in the interior of the container 12 as it is thoroughly protected towards the outside in all directions by the surrounding insulating mass 13. Only inappreciable heat losses can consequently occur.

As the mass of ore in consequence of the rotary movement is continuously stirred up and thus always fresh parts come into contact with the heated walls the heat is distributed very uniformly throughout the mass.

The ore only comes into contact with the walls of the vessel 12 and consequently cannot acquire a temperature different from that of the vessel as there is no possibility for a higher temperature to be imparted thereto from any point. The possibility of overheating and sintering of the ore are thus entirely excluded.

By varying the current supplied to the primary winding 11 it is possible to vary the temperature in the vessel 12. It is thus possible to heat this vessel 12 just to the exact reduction temperature.

As the period of time necessary in connection with each particular ore for carrying out the reduction can be determined easily, unnecessary consumption of current is avoided.

The gases resulting from the reduction are conducted away from the upper empty part of the vessel 12, as above described and through the valves 22 and the passages 28 and 29, for the purpose of further use.

In Figs. 4 and 5, numeral 41 indicates a rotatably mounted frame of a transformer, and numeral 42 designates the primary winding thereof located on the two limbs. The secondary winding is formed by an annular metal casing 43 which is protected towards the outside by heat insulating material 44. This annular vessel 43 is provided with a closable opening 45 through which an ore, for example iron ore, is introduced and through which the contents can be removed from the vessel 43. The right hand side of the rotary axis of the vessel is provided with a passage 46 through which hydrogen is supplied from the outside. The supply of gas is effected by means of a ring 47 which is pressed against the rotating shaft by means of a resilient intermediate member 48. The passage 46 in the shaft is connected to a pipe 49 leading into the vessel 43 and to three valves 50, which allow the gas to flow into the interior of the vessel 43. The three valves 50 are connected together by an annular pipe 57 into which leads the pipe 49, after it has described a complete ring 58 in the vessel 43. In this part 58 of the supply pipe the hydrogen supplied is preheated before being introduced into the mass of ore.

The valves 50 are actuated electrically and are provided with two end positions. When a current flows through the electromagnet, actuating each respective valve, the valve body 51 thereof is raised and the inner chamber 52 of the valve, provided with the outflow nozzles 53, communicates directly with the above described gas pipe 57. When the current is interrupted the valve body 51 is depressed by a spring located in the electromagnet and not shown in the drawings, until it comes to rest on the seat 54, whereby the supply of gas is cut off. At the same time the valve body 51 opens at the top a passage 55 so that the gases in the furnace can flow into the condenser 59 through the pipe 56 which is connected to the passage 65 at the left hand end of the shaft. The electrical actuation is effected in such a manner that the gas supply is opened when the valves are covered by the mass of ore to be reduced so that the gas penetrates this mass. For each valve 50 the gas supply is closed and the gas outlet opened as soon as it has passed out of the mass of ore as a result of the rotary movement. The outlet nozzles 53 are arranged laterally and shaped in the form of funnels so that the ore dust, which is continuously in movement, cannot fall thereon and lead to clogging. The nozzles 53 are preferably located in surfaces which are at least approximately parallel to the plane of rotation of the vessel 43.

The method of operation of this second form of construction is as follows:

The vessel 43 is partially charged with ore so that it is not filled completely, in order to obtain an effective and continuous mixing by the rotary movement. The primary winding 42 of the transformer 41 is then subjected to electrical potential and at the same time the furnace with the transformer is rotated slowly for, example, by means of the belt pulley 60. The magnetic flux which passes through the central column of the transformer produces in the vessel 43 a short-circuit current which heats this vessel and thus also the ore. When the temperature has reached a predetermined value hydrogen is supplied to the right hand end of the furnace through the pipe 49. Above a predetermined temperature the hydrogen possesses such great affinity relatively to the oxygen that it combines with the oxygen of the ore, for example, iron ore, and is burnt to water vapor whilst the pure iron remains. The resulting water vapor collects in the upper empty part of the furnace and is conducted away through the valves 43 and the pipe 56. As the water vapor is always mixed with hydrogen these exhaust gases are not allowed to escape into the open, but they are conducted into a condenser where the vapor, as a result of the cooling, is deposited in the form of water and the remaining gaseous hydrogen is returned into the circuit. From the condenser 59 the condensed water is conducted away through a pipe 61 and the remaining water vapor is conducted away for the purpose of further use through the pipe 62.

In Fig. 4 there are provided on the right hand side the slip rings 63 for the supply of current to the transformer. At the left hand side are provided the slip rings 64 for the actuation of the valves and for measuring the temperature in the interior of the furnace by means of a thermal element. The external parts of the furnace must naturally be subdivided and relatively insulated so as to prevent the production of short-circuit currents therein.

In the description there has been described for the sake of simplicity a single phase transformer. It will, however, be clearly understood that the method may also be applied to polyphase furnaces as will be described hereinafter with reference to one example.

For pre-heating the hydrogen from the pipe 49 it is naturally also possible to use the hot exhaust gases by passing the supply pipe through a portion of the outflow pipe on the counter-current principle.

It is also possible to provide more than three valves 50 and these may be actuated mechanically, and instead of controlling the inflow of the hydrogen and the outflow of the water vapor by the same valve body, a separate valve may be provided for each of these operations. For the pipe 58 in the vessel 43 it is also possible to substitute a number of coils.

The primary winding 42 of the transformer may naturally also be located on the central column but this has the disadvantage that the winding may be heated too strongly.

The induction furnace according to the present invention may also be arranged for three-phase current. For this purpose three single-phase transformers 70, 71 and 72 having primary windings 86 are mounted in the furnace with an annular metal casing 83, forming the secondary winding, as shown in Figs. 7 and 8.

In this case the gas inlet valves 73 are located at the center of the furnace. In order to render the heat transmission to the ore as intensive as possible, the inner cylinders 74, 75 and 76 are provided with rings 77, 78 and 79 whereby the heat transmitting surface is considerably increased.

The gas in the furnace is discharged through valves 22', which are normally spring pressed closed by springs 24'. The valves have actuating levers 87 and rollers 88 adapted to be engaged by cam guide 90 when the discharge valves are at the upper part of the rotation to open the valves and allow discharge of the gases into pipes 29'. The discharge of the gas from the pipes 29' is controlled by similarly controlled valves 22''.

As the gases which are discharged from the furnace always entrain a certain amount of ore dust, whereby the gas pipes are easily clogged, there is associated with the furnace a dust chamber 80 with multiple subdivision. In this chamber the ore particles which are entrained are deposited so that the gases leaving the furnace are as free from dust as possible. When the furnace, after the completion of the reduction, is emptied, it is also necessary at the same time to remove the ore dust from the dust chamber.

The dust chamber 80 which is heated by the outflowing gases may also be utilised for the preliminary heating of the hydrogen to be supplied. For this purpose the hydrogen, after being supplied to the hollow shaft 85, is conducted through a separate pipe 81 to coil 82 located in dust chamber 80 and which passes through division partition 89, and then from coil 89 it passes preheated through the gas valves 73 into the ore.

It will be understood that also in connection with the two examples of construction first described, ribs may be provided on the inner wall of the vessel so as to improve the heat transmission. It is also possible to provide more than three single-phase transformers, for example six thereof.

It will also be understood that according to the present invention it is possible to treat not only iron oxides but in general metal oxides or also oxides of non-metals.

This application is a division of my application filed December 7, 1937, Serial No. 178,593, now Patent Number 2,191,377 for improvements in Methods of reduction of oxides.

I claim:

1. An apparatus for the reduction of oxides by contact with reducing gas comprising a gas-tightly closed, cylindrical vessel for containing a charge of oxide to be reduced and having a cylindrical interior wall of electro-conductive metal forming a horizontal opening through the vessel, a transformer frame of magnetic metal extending through said horizontal opening, a primary transformer winding fixedly supported on said frame, means for supporting said vessel rotatably about its horizontal axis, said interior cylindrical wall of the vessel constituting a short-circuited coil serving as the secondary of the transformer and being heated thereby and transferring its heat to the charge in the vessel in contact therewith, and means for introducing reducing gas into said chamber below the level of the charge.

2. Apparatus according to claim 1, in which the means for supporting said vessel comprises a hollow shaft, said shaft having an opening in an end portion thereof connected to the interior of the vessel and serving to conduct hydrogen gas to the ore in the vessel to effect reduction thereof.

3. An apparatus according to claim 1, and wherein the cylindrical inner wall is provided with metallic ribs, said ribs serving to increase the cross section of the inner wall and reduce the resistance thereof so that the current flow and power are increased and also increasing the area of heat transfer from said wall to the charge.

4. Apparatus according to claim 1 in which a plurality of interior cylindrical walls are provided and are located radially spaced from the central axis of said vessel, each of said interior walls having a transformer frame extending therethrough and serving as a short-circuited secondary transformer coil.

HANS GALLUSSER.